United States Patent
Miyashita et al.

(10) Patent No.: US 7,055,500 B2
(45) Date of Patent: Jun. 6, 2006

(54) IGNITION TIMING CONTROL APPARATUS FOR INTERNAL COMBUSTION ENGINE

(75) Inventors: Shigeki Miyashita, Susono (JP); Hiroshi Tanaka, Susono (JP); Hiroyuki Hokuto, Numazu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/185,697

(22) Filed: Jul. 21, 2005

(65) Prior Publication Data

US 2006/0037581 A1 Feb. 23, 2006

(30) Foreign Application Priority Data

Jul. 30, 2004 (JP) ............................. 2004-224716

(51) Int. Cl.
*F02P 5/15* (2006.01)
(52) U.S. Cl. .................. 123/406.47; 123/431; 123/295
(58) Field of Classification Search ................ 123/295, 123/430, 431, 406.26, 406.45, 406.47
See application file for complete search history.

(56) References Cited

U.S. PATENT DOCUMENTS

| | | | |
|---|---|---|---|
| 6,314,940 B1 | 11/2001 | Frey et al. | |
| 6,644,275 B1* | 11/2003 | Kondo | .................. 123/406.47 |
| 2002/0020393 A1* | 2/2002 | Ogawa et al. | ......... 123/406.26 |
| 2002/0026921 A1* | 3/2002 | Ueno et al. | .................. 123/295 |
| 2005/0172931 A1* | 8/2005 | Mori | .......................... 123/431 |
| 2006/0016430 A1* | 1/2006 | Sadakane et al. | ........... 123/431 |

FOREIGN PATENT DOCUMENTS

| | | |
|---|---|---|
| EP | 0 892 161 A2 | 1/1999 |
| EP | 0 943 793 A2 | 9/1999 |
| EP | 1 299 235 A2 | 8/2002 |
| EP | 1 267 070 A1 | 12/2002 |
| EP | 1 277 942 A2 | 1/2003 |
| JP | 02-191819 A | 7/1990 |
| JP | 06-53728 U | 7/1994 |
| JP | 2001-020837 A | 1/2001 |
| JP | 2002-227697 A | 8/2002 |

\* cited by examiner

*Primary Examiner*—Erick Solis
(74) *Attorney, Agent, or Firm*—Oliff & Berridge, PLC

(57) ABSTRACT

For an internal combustion engine including an in-cylinder injector and an intake port injector, proper ignition timing setting means is provided for setting a proper ignition timing according to the fuel injection ratio between injection from the in-cylinder injector and injection from the intake port injector. When a change is made in the fuel injection ratio, the proper ignition timing setting means selects one of a proper ignition timing value before the change and a proper ignition timing value after the change that is on the retard side and sets the ignition timing at the selected proper ignition timing value in at least a predetermined period of time after the change.

12 Claims, 11 Drawing Sheets

IGNITION TIMING CONTROL APPARATUS FOR INTERNAL COMBUSTION ENGINE

This nonprovisional application is based on Japanese Patent Application No. 2004-224716 filed with the Japan Patent Office on Jul. 30, 2004, the entire contents of which are hereby incorporated by reference.

BACKGROUND OF THE INVENTION

1. Field of the Invention

The present invention relates to an ignition timing control apparatus for an internal combustion engine, and particularly to an ignition timing control apparatus for an internal combustion engine of so-called dual injection type that includes an in-cylinder injector for injecting a fuel into a cylinder and an intake port injector for injecting a fuel into an intake manifold or intake port.

2. Description of the Background Art

An internal combustion engine of so-called dual injection type is known from Japanese Patent Laying-Open No. 2001-020837. This internal combustion engine includes an in-cylinder injector for injecting a fuel into a cylinder and an intake port injector for injecting a fuel into an intake manifold or intake port. According to an operation state, switching is made between these injectors for use to achieve for example stratified charge combustion in a low-load operation region and homogeneous combustion in a high-load operation region, or these injectors are simultaneously used while the fuel injection ratio between the injectors is changed to achieve homogeneous lean combustion and homogeneous stoichiometric combustion, thereby improving fuel economy characteristics and output characteristics.

Generally, for an internal combustion engine of the fuel injection type, in order to allow proper combustion to occur according to an operation state, a final ignition timing is determined by adding various corrective advance (or retard) values according to an engine state to a basic ignition timing value that is set in advance in association with the operation state and stored for example in a map. Ignition is caused to occur based on the determined final ignition timing for operation.

Regarding the aforementioned dual-injection-type internal combustion engine, because of the difference in injection manner, namely depending on whether the injection manner is the one in which the fuel is injected from the in-cylinder injector or the one in which the fuel is injected from the intake port injector, the temperature of an air-fuel mixture and the state of mixture of the fuel in a combustion chamber could vary. A resultant problem is that, if ignition is simply caused for operation based on an ignition timing value that is set according to an operation state, the ignition timing is improper.

For example, when the fuel is injected from the in-cylinder injector, it is likely that the fuel distribution in the combustion chamber is uneven as compared with the case where the fuel is injected from the intake port injector. If the air-fuel mixture is ignited in the state where the fuel distribution is uneven, combustion proceeds slowly in a low-fuel-concentration portion and thus the combustion rate of the air-fuel mixture tends to be slow. Even if the fuel distribution is not uneven, latent heat of the injected fuel causes the temperature of the air-fuel mixture in the cylinder to decrease, resulting in a low combustion rate. Thus, since the combustion rate of the air-fuel mixture varies depending on whether the fuel injection manner is the fuel injection by the in-cylinder injector or the fuel injection by the intake port cylinder, the ignition timing has to be set appropriately. Otherwise, such abnormal combustion as knocking occurs or the output power is insufficient.

Further, in a transitional operation state where the injection manner is switched from the injection by the in-cylinder injector or from the injection by the intake port injector or the injection ratio between these injectors is changed, the change in injection manner or injection ratio could result in a different port wall temperature and a different inner-cylinder-wall temperature as well as a different amount of fuel sticking to the port wall, the inner cylinder wall and the top wall of the piston as compared with those in a normal state. Accordingly, the temperature of the air-fuel mixture and the state of mixture of the fuel in the combustion chamber could vary. In such a state, if the ignition timing is set to the one determined in a stable state, knocking due to excessive advance or insufficient output power due to excessive retard for example could occur because of the ignition timing that is different from a proper value.

SUMMARY OF THE INVENTION

In view of the aforementioned conventional problems, an object of the present invention is to provide an ignition timing control apparatus for an internal combustion engine that includes an in-cylinder injector and an intake-port injector, reducing the possibilities for example of occurrence of knocking due to excessive advance and insufficient output power due to excessive retard.

In an aspect of the present invention achieving the object above, an ignition timing control apparatus for an internal combustion engine having an in-cylinder injector and an intake port injector includes a proper ignition timing setting unit for setting a proper ignition timing according to a fuel injection ratio of injection from the in-cylinder injector and a fuel injection ratio of injection from the intake port injector.

Here, preferably, the proper ignition timing setting unit sets a proper ignition timing according to the fuel injection ratio in a current operation state, based on at least a basic ignition timing value in a case where the fuel injection ratio of the injection from the in-cylinder injector exceeds 50% and thus the injection is mainly direct injection and a basic ignition timing value in a case where the fuel injection ratio of the injection from the intake port injector exceeds 50% and thus the injection is mainly port injection.

Preferably, when a change is made in the fuel injection ratio, the proper ignition timing setting unit selects one of a proper ignition timing value before the change and a proper ignition timing value after the change that is on the retard side and sets, in at least a predetermined period of time after the change, the ignition timing at the selected ignition timing value.

Preferably, when a change is made in the fuel injection ratio so that the fuel injection ratio of the injection from the in-cylinder injector is higher than the fuel injection ratio of the injection from the intake port injector, the proper ignition timing setting unit sets the ignition timing by advancing the ignition timing at a predetermined rate toward the proper ignition timing value associated with the fuel injection ratio after the change, after the predetermined period of time has passed.

Preferably, when a change is made in the fuel injection ratio so that the fuel injection ratio of the injection from the in-cylinder injector is lower than the fuel injection ratio of the injection from the intake port injector, the proper ignition timing setting unit sets the ignition timing by retarding the ignition timing by at most a predetermined retard limit amount and thereafter retarding the ignition timing at a predetermined rate toward the proper ignition timing value associated with the fuel injection ratio after the change.

Preferably, when a change is made in the fuel injection ratio so that the fuel injection ratio of the injection from the in-cylinder injector is higher than the fuel injection ratio of the injection from the intake port injector, the proper ignition timing setting unit sets the ignition timing at an ignition timing retarded by a predetermined retard limit amount with respect to a proper ignition timing value associated with the fuel injection ratio after the change, and thereafter setting the ignition timing by advancing the ignition timing at a predetermined rate toward the proper ignition timing value associated with the fuel injection ratio after the change.

Regarding the ignition timing control apparatus for an internal combustion engine in an aspect of the present invention, for the internal combustion engine including an in-cylinder injector and an intake port injector, the proper ignition timing setting unit sets a proper ignition timing according to the fuel injection ratio between the injection from the in-cylinder injector and the injection from the intake port injector and accordingly ignition is caused to occur. Therefore, even if the temperature of the air-fuel mixture and the state of mixture of the fuel in the combustion chamber vary due to a difference in injection manner and fuel injection ratio, the ignition is caused to occur for operation based on the ignition timing value that is set at the proper ignition timing associated with the operation state. Thus, the possibilities of occurrence of knocking due to excessive advance and insufficient output power due to excessive retard are reduced.

Here, with the manner in which the proper ignition timing setting unit sets the proper ignition timing according to the fuel injection ratio in a current operation state based on at least the basic ignition timing value in the case where the fuel injection ratio of the injection from the in-cylinder injector exceeds 50% and thus the injection is mainly direct injection and the basic ignition timing value in the case where the fuel injection ratio of the injection from the intake port injector exceeds 50% and thus the injection is mainly port injection, the amount of data stored in a memory can be reduced and thus a memory of a smaller capacity can be applied for use.

With the manner in which the proper ignition timing setting unit selects, when a change is made in fuel injection ratio, one of a proper ignition timing value before the change and a proper ignition timing value after the change that is on the retard side and sets the selected one as the ignition timing in at least a predetermined period after the change, occurrence of knocking can surely be prevented and, torque shock can be prevented without excessively great change in output power.

With the manner in which the proper ignition timing setting unit sets the ignition timing, when a change is made in fuel injection ratio so that the fuel injection ratio of the injection from the in-cylinder injector is higher than the injection from the intake port injector, by advancing the ignition timing at a predetermined rate toward the proper ignition timing value associated with the fuel injection ratio after the change, after a predetermined period has passed, torque shock can be prevented without excessively great change in output power.

Further, with the manner in which the proper ignition timing setting unit sets the ignition timing, when a change is made in fuel injection ratio so that the fuel injection ratio of the injection from the in-cylinder injector is lower than the injection from the intake port injector, by retarding the ignition timing by at most a predetermined retard limit amount and thereafter retarding the ignition timing at a predetermined rate toward the proper ignition timing value associated with the fuel injection ratio after the change, torque shock can be prevented without excessive decrease in output power.

Furthermore, with the manner in which the proper ignition timing setting unit sets the ignition timing, when a change is made in fuel injection ratio so that the fuel injection ratio of the injection from the in-cylinder injector is higher than the fuel injection ratio of the injection from the intake port injector, by retard by a predetermined retard limit amount with respect to the proper ignition timing value associated with the fuel injection ratio after the change and thereafter advancing the ignition timing at a predetermined rate toward the proper ignition timing value associated with the fuel injection ratio after the change, torque shock can be prevented without excessive decrease in output power as the above-described manner.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are hereinafter described with reference to the drawings.

Figure 1:
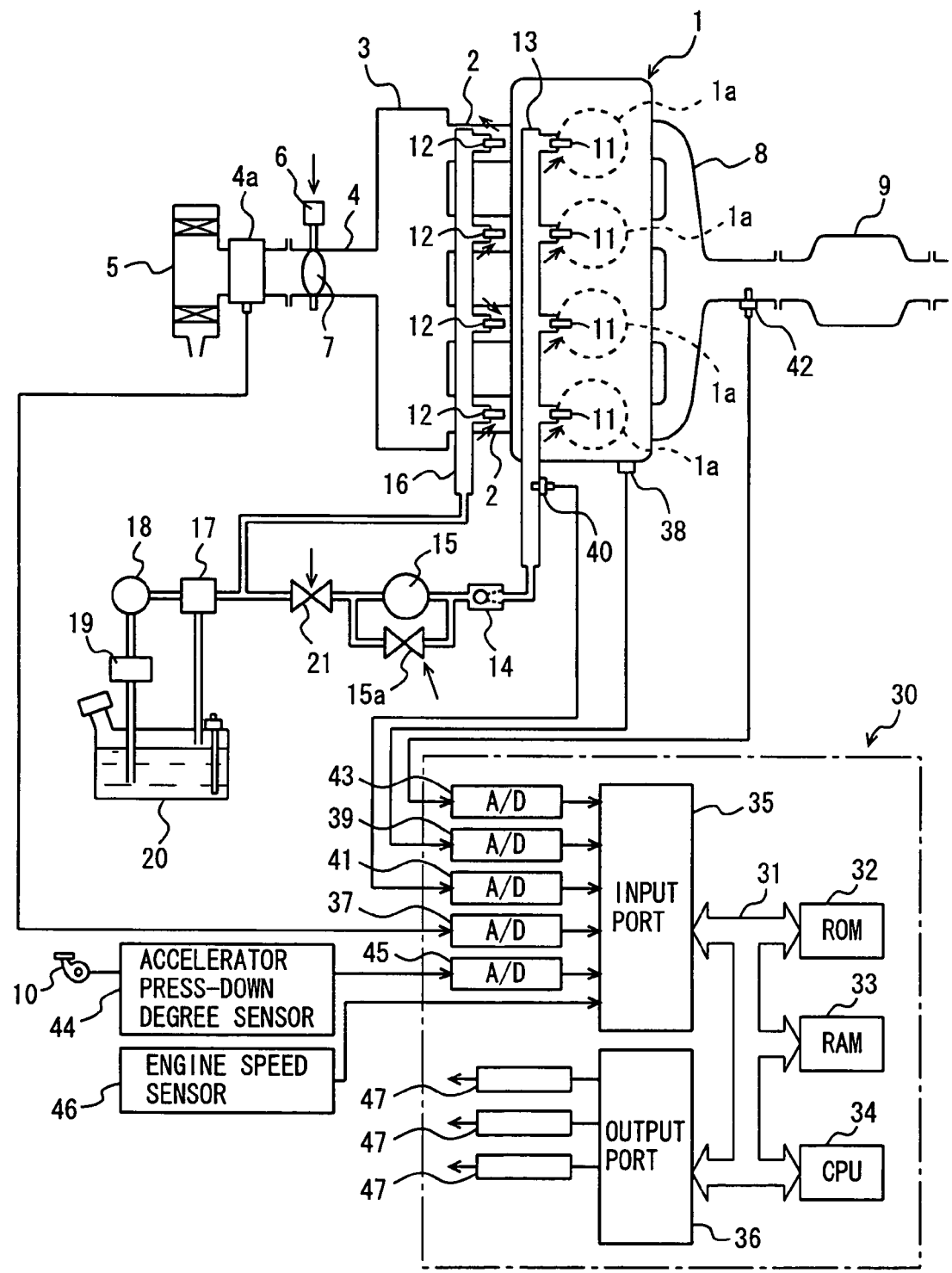
FIG. 1 schematically shows a configuration of an ignition timing control apparatus for a dual-injection-type internal combustion engine according to the present invention.

Referring to FIG. 1 that schematically shows a configuration of a dual-injection-type internal combustion engine to which an ignition timing control apparatus of the present invention is applied, an engine 1 includes four cylinders 1a. Cylinders 1a are connected through corresponding intake manifold branches 2 respectively to a common surge tank 3. Surge tank 3 is connected through an intake duct 4 to an airflow meter 4a and airflow meter 4a is connected to an air cleaner 5. Within intake duct 4, a throttle valve 7 driven by a step motor 6 is provided. This throttle valve 7 opens/closes intake duct 4 substantially in accordance with press-down of an accelerator pedal 10. Cylinders 1a are connected to a common exhaust manifold 8 and this exhaust manifold 8 is connected to a three-way catalytic converter 9.

To each cylinder 1a, an in-cylinder injector 11 for injecting a fuel into the cylinder as well as an intake port injector 12 for injecting a fuel into an intake port or intake manifold are attached. These injectors 11, 12 are each controlled by an output signal of an electronic control unit 30. In-cylinder injectors 11 are connected to a common fuel delivery pipe 13 and fuel delivery pipe 13 is connected, through a check valve 14 allowing a flow toward fuel delivery pipe 13, to an engine-driven high-pressure fuel pump 15.

As shown in FIG. 1, the discharge side of high-pressure fuel pump 15 is connected through an electromagnetic spill valve 15a to the intake side of high-pressure fuel pump 15. As the degree of opening of this electronic spill valve 15a is smaller, the amount of fuel supplied from high-pressure fuel pump 15 into fuel delivery pipe 13 is increased. When electromagnetic spill valve 15a is fully-opened, the fuel supply from high-pressure fuel pump 15 to fuel delivery pipe 13 is stopped. Here, electromagnetic spill valve 15a is controlled based on an output signal of electronic control unit 30.

Intake port injectors 12 are connected to a common fuel delivery pipe 16, and fuel delivery pipe 16 and high-pressure fuel pump 15 are connected through a common fuel pressure regulator 17 to an electric-motor-driven low-pressure fuel pump 18. Further, low-pressure fuel pump 18 is connected through a fuel filter 19 to a fuel tank 20. When the pressure of fuel discharged from low-pressure fuel pump 18 becomes higher than a set fuel pressure that is determined in advance, fuel pressure regulator 17 returns a part of the fuel discharged from low-pressure fuel pump 18 to fuel tank 20. In this way, it is prevented that the pressure of fuel supplied to intake port injector 12 and the pressure of fuel supplied to high-pressure fuel pump 15 become higher than the above-described set fuel pressure. Moreover, as shown in FIG. 1, an open/close valve 21 is provided between high-pressure fuel pump 15 and fuel pressure regulator 17. In a normal state, open/close valve 21 is opened. Open/close valve 21 is closed to stop fuel supply from low-pressure fuel pump 18 to high-pressure fuel pump 15. Opening/closing of open/close valve 21 is controlled based on an output signal of electronic control unit 30.

Figure 2:
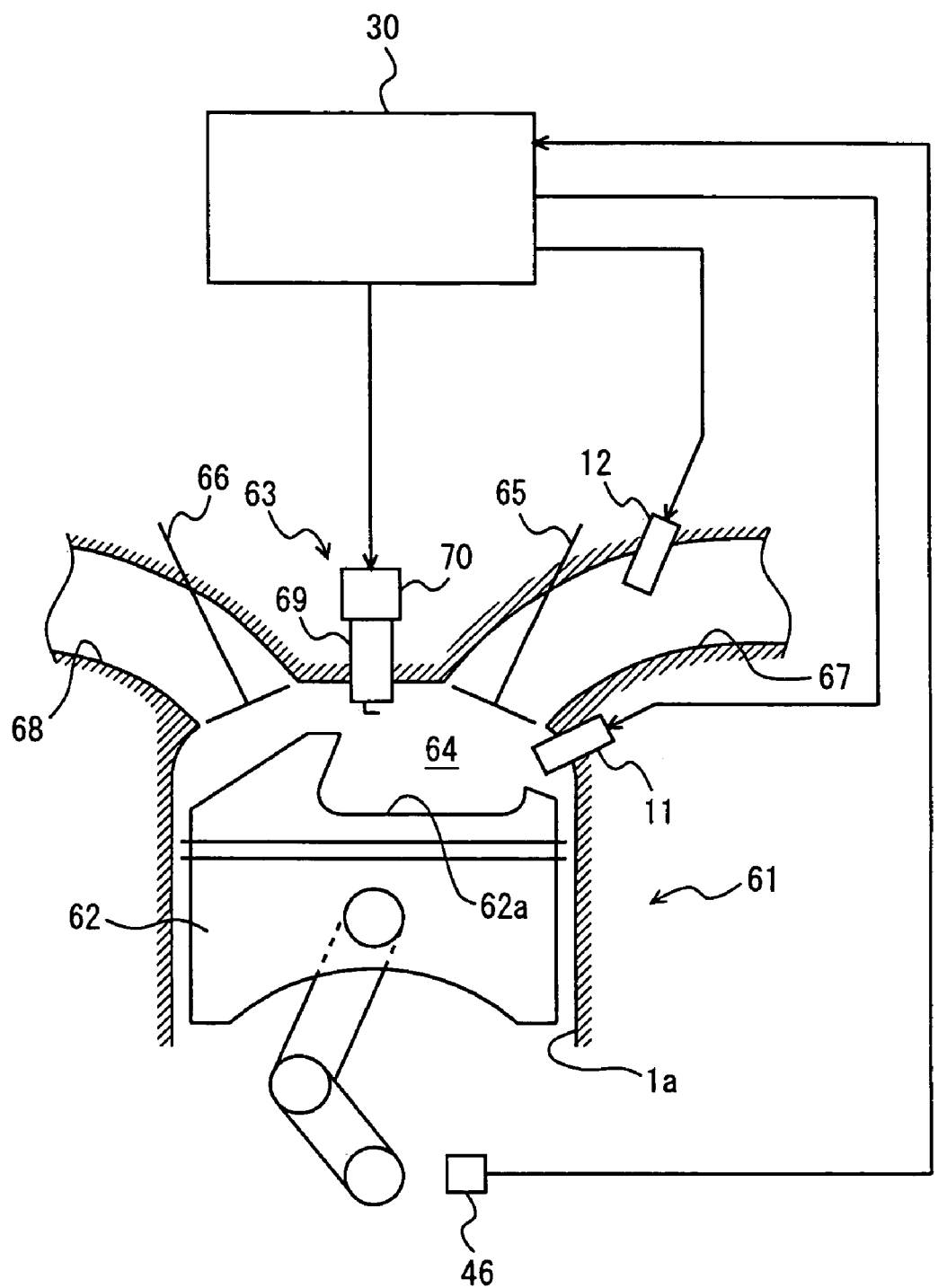
FIG. 2 is a side cross-sectional view of the engine shown in FIG. 1.

FIG. 2 shows a side cross-sectional view of cylinder 1a. Referring to FIG. 2, cylinder 1a includes a cylinder block 61, a piston 62 having its top surface where a concave 62a is formed, a cylinder head 63 secured on cylinder block 61, a combustion chamber 64 formed between piston 62 and cylinder head 63, an intake valve 65, an exhaust valve 66, an intake port 67, an exhaust port 68, a spark plug 69, and an ignitor 70. Intake port 67 is formed to allow air flowing into combustion engine 64 to generate swirls around the cylinder axis. Concave 62a extends from the portion of the periphery of piston 62 where in-cylinder injector 11 is located to the central portion of piston 62 and also extends upward below spark plug 69. Engine speed sensor 46 generates output pulses representing the rotation angle of a crankshaft that is the engine output shaft and accordingly representing the engine speed namely engine rpm.

Electronic control unit 30 is constituted of a digital computer and includes a ROM (read-only memory) 32, a RAM (random-access memory) 33 and a CPU (microprocessor) 34 connected to each other through a bidirectional bus 31 as well as an input port 35 and an output port 36. Airflow meter 4a generates an output voltage proportional to an intake air quantity, and the output voltage of airflow meter 4a is input through an AD converter 37 to input port 35. To engine 1, a water temperature sensor 38 generating an output voltage proportional to an engine coolant temperature is attached, and the output voltage of water temperature sensor 38 is input through an AD converter 39 to input port 35. To fuel delivery pipe 13, a fuel pressure sensor 40 generating an output voltage proportional to the fuel pressure in fuel delivery pipe 13 is attached, and the output voltage of fuel pressure sensor 40 is input through an AD converter 41 to input port 35. To exhaust manifold 8 located upstream of catalytic converter 9, an air/fuel ratio sensor 42 generating an output voltage proportional to the oxygen concentration in a discharge gas is attached, and the output voltage of air/fuel ratio sensor 42 is input through an AD converter 43 to input port 35.

Accelerator pedal 10 is connected to an accelerator press-down degree sensor 44 generating an output voltage proportional to the degree of press down of accelerator pedal 10, and the output voltage of accelerator press-down degree sensor 44 is input through an AD converter 45 to input port 35. To input port 35, engine speed sensor 46 generating an output pulse representing the engine speed is connected. In ROM 32 of electronic control unit 30, a basic fuel injection quantity and an ignition timing value described hereinlater that are set according to an operation state as well as correction values based on the engine coolant temperature for example are mapped and stored in advance based on an engine load factor obtained from accelerator press-down degree sensor 44 or airflow meter 4a and the engine speed obtained from engine speed sensor 46.

Output port 36 of electronic control unit 30 is connected to step motor 6, in-cylinder injectors 11 each, intake port injectors 12 each, and ignitor 70 of spark plug 69 for example through respective drive circuits 47.

Figure 3:
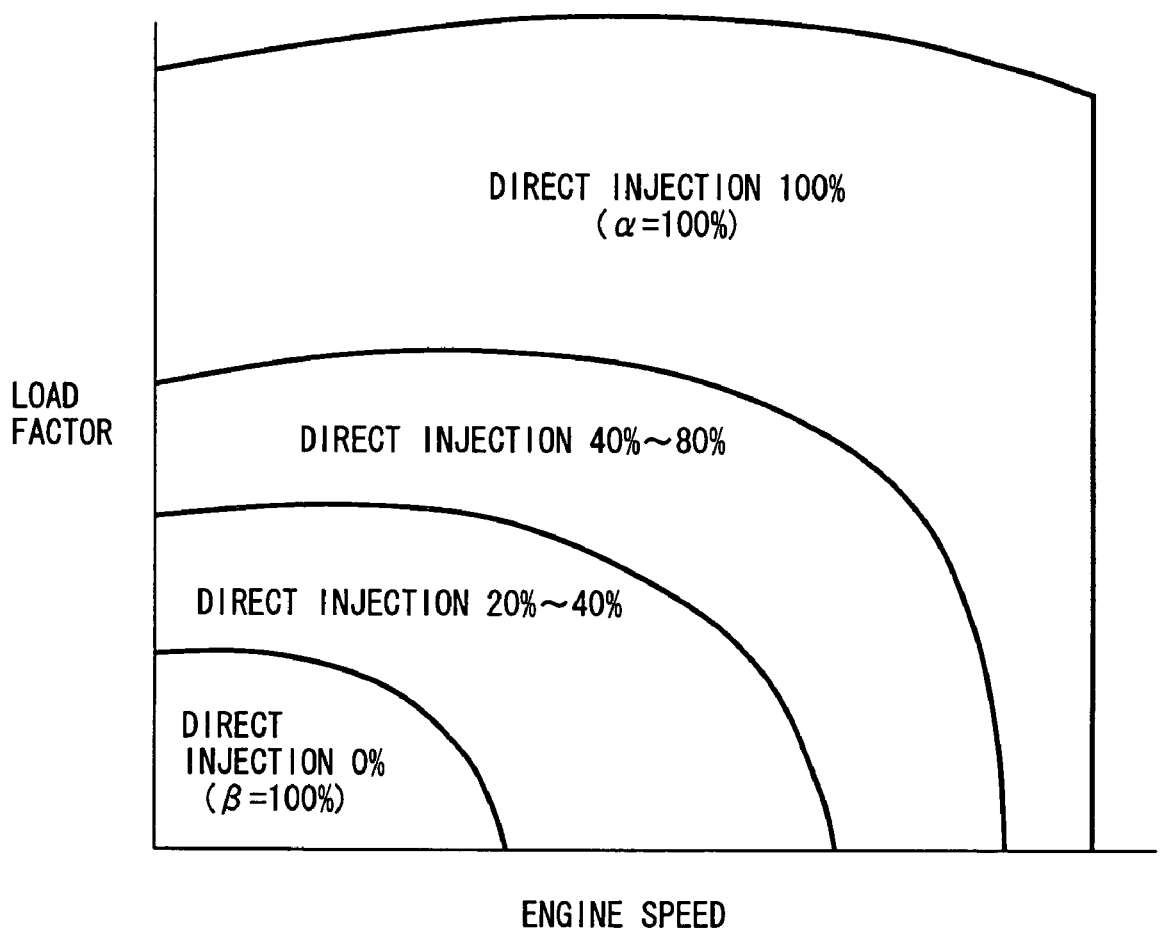
FIG. 3 is a graph showing an example of the relation between a combustion manner that is set according to an operation region or conditions of an engine to which the present invention is applied and a fuel injection ratio between an in-cylinder injector and an intake port injector.

In engine 1 of the present embodiment, for example, a combustion manner or an injection manner is set in correspondence with the operation region or a condition map as shown in FIG. 3, and ratio $\alpha$ and ratio $\beta$ of injection from in-cylinder injector 11 and intake port injector 12 respectively are determined. Here, fuel injection ratio $\alpha$ represents a ratio of a quantity of fuel injected from in-cylinder injector 11 to the total fuel injection quantity, while fuel injection ratio $\beta$ represents a ratio of a quantity of fuel injected from intake port injector 12 to the total fuel injection quantity. Here, $\alpha+\beta=100\%$. In FIG. 3, direct injection 100% represents a region where ratio $\alpha$ of injection only from in-cylinder injector 11 is set to 100%, that is, $\beta=0\%$. Meanwhile, direct injection 0% represents a region where ratio $\beta$ of injection only from intake port injector 12 is set to 100%, that is, $\alpha$=0%. Furthermore, direct injection 40–80% means that $\alpha$ is set to 40–80% and $\beta$ is set to 60–20%, however, values for ratio $\alpha$ and ratio $\beta$ may be varied as appropriate, in accordance with the operation condition required to engine 1 that is used.

Electronic control unit 30 performs various control operations including fuel injection control and ignition timing control. Referring to the flowchart shown in FIG. 4, a proper ignition timing setting routine for the ignition timing is described according to the embodiment of the present invention. The proper ignition timing setting routine is executed for example each time the crank angle advances by a predetermined angle. In step S401, as parameters representing an operation state of engine 1, the engine speed calculated from the measurement of engine speed sensor 46 and the engine load factor based on the degree of press-down of the accelerator detected by accelerator press-down degree sensor 44 are read. Then, in step S402, from basic map A stored in advance in a memory of electronic control unit 30 in association with injection manner A, a basic ignition timing value in the aforementioned operation state is obtained. Further, in step S403, from basic map B stored in advance in the memory of electronic control unit 30 in association with injection manner B, a basic ignition timing value in the aforementioned operation state is obtained.

Figure 5:
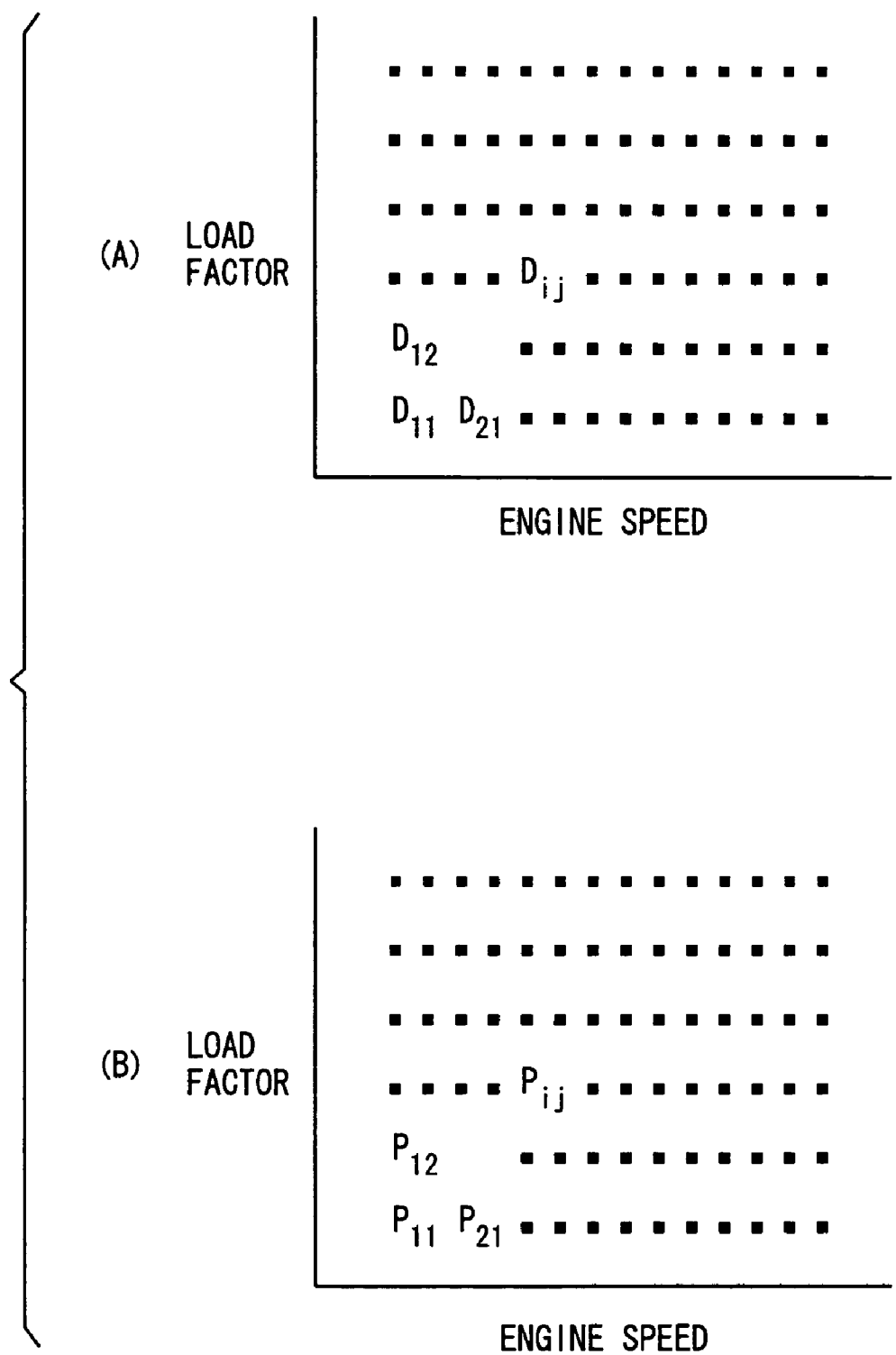
FIG. 5 is an example of maps storing basic ignition timing values associated with an injection manner used in the embodiment of the present invention, basic map A associated with injection manner A of 100% direct injection indicated by (A), and basic map B associated with injection manner B of 100% port injection indicated by (B).

In the present embodiment, injection manner A corresponds to the case where the ratio of injection from in-cylinder injector 11, namely fuel injection ratio $\alpha$ is equal to 100% ($\alpha$=100%) (hereinafter, also referred to as "100% direct injection"), and injection manner B corresponds to the case where the ratio of injection from intake port injector 12 is equal to 100% ($\beta$=100%) (hereinafter, also referred to as "100% port injection"). Basic map A and basic map B associated respectively with injection manner A and injection manner B are each a two-dimensional map with the vertical axis indicating the load factor and the horizontal axis indicating the engine speed as shown in FIG. 5 as (A) and (B), and each basic ignition timing value associated with an operation state is stored. More specifically, in basic map A, the data of basic ignition timing value Dij for the 100% direct injection is stored and, in basic map B, the data of basic ignition timing value Pij for the 100% port injection is stored. Here, basic ignition timing values Dij and Pij are each expressed by a crank angle relative to the top dead center.

After steps S402 and S403 described above, the routine proceeds to step S404 in which fuel injection ratio $\alpha$ and/or $\beta$ in a current operation state is obtained from the map shown in FIG. 3 based on the engine speed and the engine load factor read in step S401. Then, in step S405, from basic map A and basic map B described above, a proper ignition timing value (D+P) ij associated with fuel injection ratio $\alpha$ and/or $\beta$ in the current operation state is obtained by interpolation of basic ignition timing values Dij and Pij set in the maps.

Thus, in electronic control unit 30, the functional elements performing steps S401 to S405 described above correspond to proper ignition timing setting means for setting a proper ignition timing in association with the fuel injection ratio between injection from in-cylinder injector 11 and injection from intake port injector 12.

Instead of basic map A for the 100% direct injection and basic map B for the 100% port injection used in the above-discussed embodiment, basic map A1 and basic map B2 may be used. Basic map A1 stores basic ignition timing values in the case where the injection is mainly the direct injection, specifically where fuel injection ratio $\alpha$ of the injection from in-cylinder injector 11 exceeds 50%. Basic map B2 stores basic ignition timing values in the case where the injection is mainly the intake port injection, specifically where the fuel injection ratio of the injection from intake port injector 12 exceeds 50%. Alternatively, a combination of basic map A and basic map B1 or a combination of basic map A1 and basic map B may be used to determine, by interpolation, a proper ignition timing value associated with fuel injection ratio $\alpha$ and/or $\beta$ in the current operation state. In this way, the amount of data stored in memory 32 can be reduced so that a memory of a small capacity can be applied for an intended use.

The proper ignition timing herein refers to an ignition timing at which favorable ignition and combustion occurs when engine 1 is operated at a predetermined fuel injection ratio (including the case where $\alpha$=0 or $\beta$=0). The specific value of the ignition timing differs depending on an applied engine. To the proper ignition timing, various corrections may be made based on the coolant temperature and air/fuel ratio control for example of engine 1, which is well known, and accordingly the final ignition timing is set and ignition is allowed to occur. As such corrections are well-known, a detailed description thereof will not be given here.

Thus, in the present embodiment, even if the temperature of the air-fuel mixture and the mixture state of the fuel in combustion chamber 64 vary due to a difference in fuel injection ratio, ignition is allowed to occur based on the ignition timing value set at a proper ignition timing associated with the operation state. Therefore, the possibilities of occurrence of knocking due to excessive advance and insufficient output power due to excessive retard can be reduced.

Figure 6:
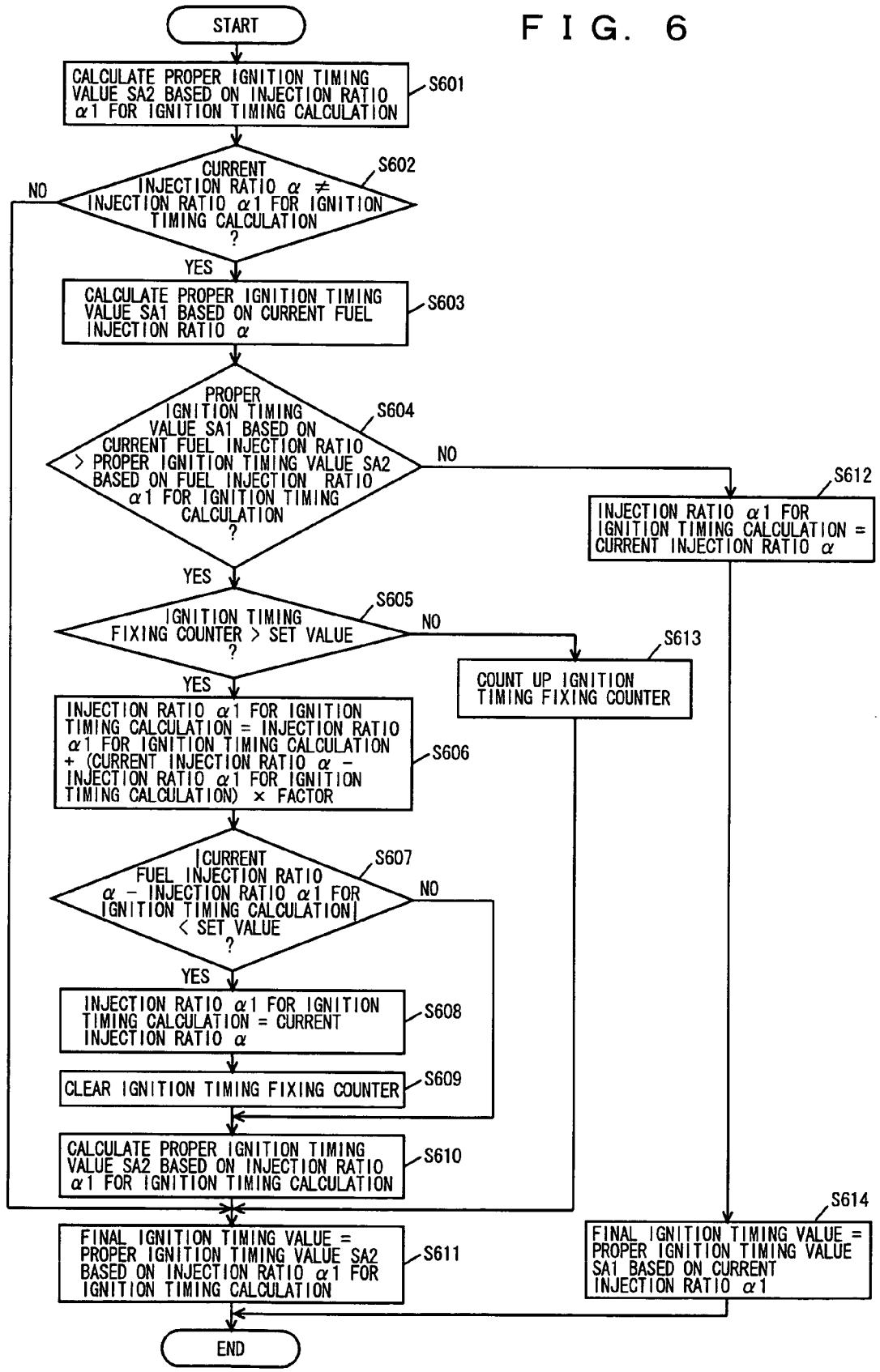
FIG. 6 is a flowchart showing an exemplary ignition timing control routine according to a first modification of the embodiment of the present invention.

Referring to the flowchart in FIG. 6, a first modification of the embodiment of the present invention is described. The first modification is applied to the case where the injection manner is changed according to a change in operation state of engine 1, for example, where injection manner A of the 100% direct injection is changed to injection manner B of the 100% port injection or vise versa, or the case where the injection manner is A+B and a certain injection ratio $\alpha$ (here, $\beta$=100–$\alpha$ as seen from the above and thus only the fuel injection ratio $\alpha$ of the injection from in-cylinder injector 11 is herein used) is changed to another fuel injection ratio $\alpha$.

Figure 4:
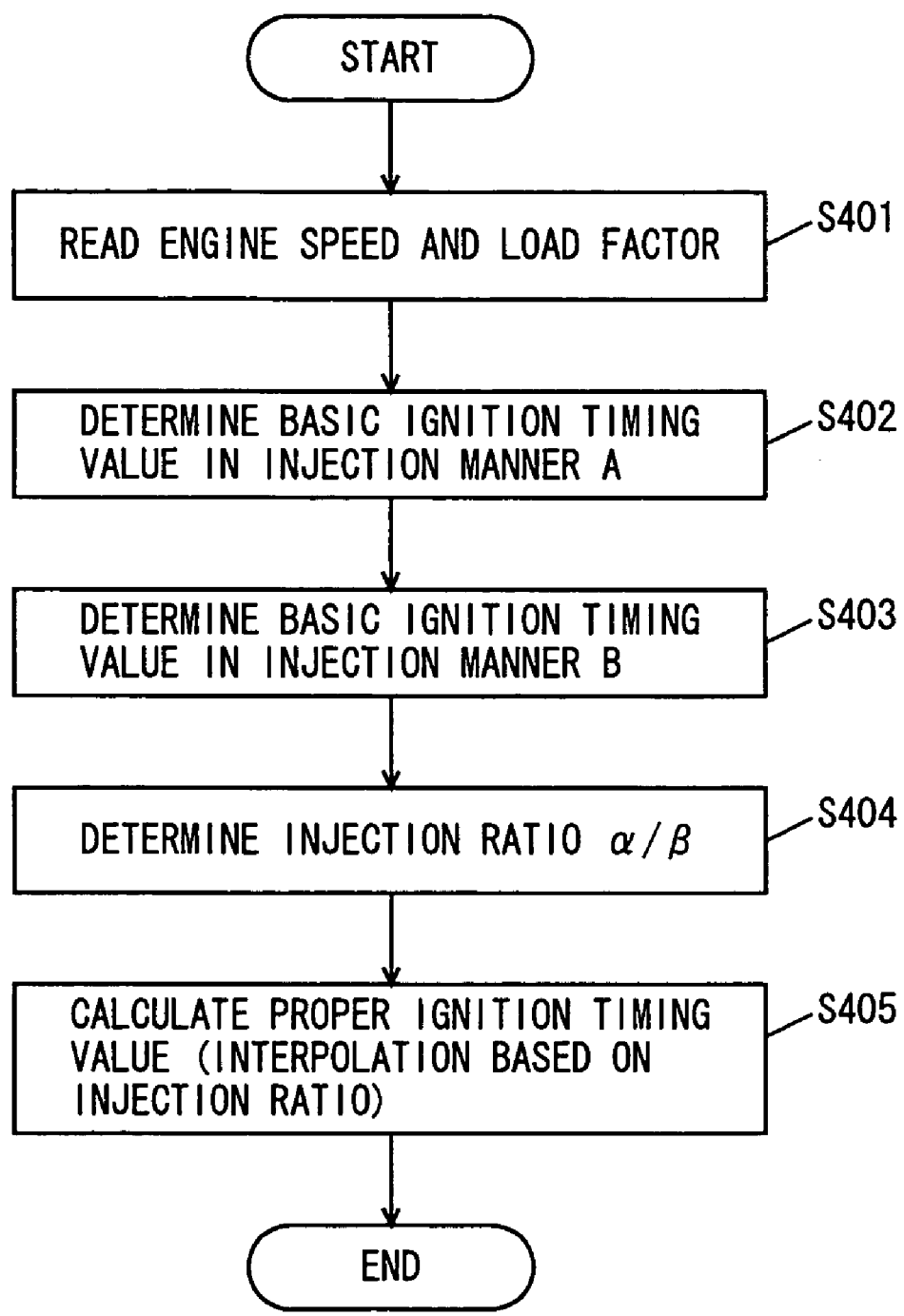
FIG. 4 is a flowchart showing an exemplary ignition timing control routine according to an embodiment of the present invention.

The control starts and, in step S601, following the procedure of the proper ignition timing setting routine shown in the flowchart of FIG. 4 in the above-described embodiment, a proper ignition timing value associated with a fuel injection ratio is calculated as proper ignition timing value SA2 associated with fuel injection ratio $\alpha$1 that is used for calculating the ignition timing. In the following step S602, it is determined whether fuel injection ratio $\alpha$ in the current operation state is unequal to fuel injection ratio $\alpha$1 used for calculating the ignition timing in step S601. Namely, when they are unequal to each other and the answer is "YES," it is determined that the operation state changes, i.e., the operation state is in a transition state, and the routine proceeds to step S603.

In contrast, when they are equal to each other and the answer is "NO," it is determined that the operation state is in a normal state where the operation state does not change and the routine proceeds to step S611 in which it is determined that the final ignition timing value is proper ignition timing value SA2 associated with fuel injection ratio $\alpha$1 for calculating the ignition timing and the routine is ended. Here, fuel injection ratio $\alpha$1 for calculating the ignition timing is a temporary injection ratio used for calculating the ignition timing and the temporary injection ratio is used until the ignition timing is corrected to a target ignition timing after a predetermined delay. As the ignition timing approaches the target ignition timing, α1 is set to α(α1=α).

In step S603 performed when the operation state is in a transition state, proper ignition timing value SA1 associated with fuel injection ratio α in the current operation state is determined. In the following step S604, a comparison is made between proper ignition timing value SA1 associated with fuel injection ratio α in the current operation state and proper ignition timing value SA2 associated with fuel injection ratio α1 used for calculating the ignition timing to determine which of the ignition timing values is on the retard side.

When proper ignition timing value SA2 associated with fuel injection ratio α1 for calculating the ignition timing is on the retard side as compared with proper ignition timing value SA1 associated with fuel injection ratio α in the current operation state, the process proceeds to step S605 in which it is determined whether a count value of an ignition timing fixing counter exceeds a predetermined set value.

The ignition timing fixing counter is used, when the fuel injection ratio is changed as described above, for selecting one of a proper ignition timing value before the change and a proper ignition timing value after the change that is on the retard side and setting the ignition timing at the selected ignition timing value in at least a predetermined period of time after the change. As the set value of the counter, a predetermined period corresponding to any number of times between ten to twenty the ignition is caused to occur or the period of elapsed time may be used.

In step S605, when it is determined that the count value does not exceed the predetermined set value, the routine proceeds to step S613 in which the value of the ignition timing fixing counter is counted up and the routine proceeds to S611. In step S611, as described above, the final ignition timing value is set at proper ignition timing value SA2 associated with fuel injection ratio α1 for calculating the ignition timing and then the routine is ended.

In contrast, when it is determined in step S604 that proper ignition timing value SA2 associated with fuel injection ratio α1 for calculating the ignition timing is on the advance side as compared with proper ignition timing value SA1 associated with fuel injection ratio α in the current operation state, in other words, when proper ignition timing value SA1 associated with fuel injection ratio α in the current operation state is on the retard side as compared with proper ignition timing value SA2 associated with fuel injection ratio α1 for calculating the ignition timing, namely the answer is "NO," the routine proceeds to step S612. In step S612, fuel injection ratio α in the current operation state is made equal to fuel injection ratio α1 for calculating the ignition timing. Then in step S614, the final ignition timing value is set at proper ignition timing value SA1 associated with fuel injection ratio α in the current operation state. The routine is then ended.

In step S605 described above, when it is determined that the count value exceeds the predetermined set value, namely a predetermined period of time has passed since the fuel injection ratio is changed, the routine proceeds to step S606 to perform the routine of setting the ignition timing while advancing the ignition timing toward proper ignition timing value SA1 associated with current fuel injection ratio α after the fuel injection ratio is changed. Specifically, in step S606, fuel injection ratio α1 for calculating the ignition timing is determined by the following formula:

Fuel injection ratio α1 for ignition timing calculation=fuel injection ratio α1 for ignition timing calculation+(fuel injection ratio α in the current operation state−fuel injection ratio α1 for ignition timing calculation)×factor.

This factor may be a constant value, a value of a quadric curve according to a change in coolant temperature of the engine or a linear value proportional to the quantity of intake air.

In the subsequent step S607, a determination is made for ending the routine of setting the ignition timing while advancing it at a predetermined rate toward proper ignition timing value SA1 associated with the current fuel injection ratio α. Specifically, it is determined whether the absolute value of the difference between the current fuel injection ratio α and the fuel injection ratio α1 for ignition timing calculation is smaller than a predetermined value. When the absolute value of the difference is not smaller than the predetermined value, namely when the answer is "NO," the routine proceeds to step S610 in which proper ignition timing value SA2 associated with fuel injection ratio α1 for calculating the ignition timing is determined. Then the routine proceeds to step S611 in which this proper ignition timing value SA2 is set as the final ignition timing value, as discussed above.

However, when it is determined in step S607 that the absolute value of the difference between the current fuel injection ratio α and the fuel injection ratio α1 for calculating the ignition timing is smaller than the predetermined value, namely the answer is "YES," the routine proceeds to step S608 in which the current fuel injection ratio α and the fuel injection ratio α1 for calculating the ignition timing are made equal to each other for ending the routine of setting the ignition timing while advancing the ignition timing at a predetermined rate toward proper ignition timing value SA1 associated with the current fuel injection ratio α. Then, in step S609, the count value of the ignition timing fixing counter is cleared.

In steps S610 and S611 after step S609 is performed, instead of proper ignition timing value SA2 shown in FIG. 6 and described above, proper ignition timing value SA1 associated with the current fuel injection ratio α is calculated that is set as the final ignition timing value. It is noted that, although the ignition timings are expressed differently, they are identical as a substantial ignition timing value.

Figure 7:
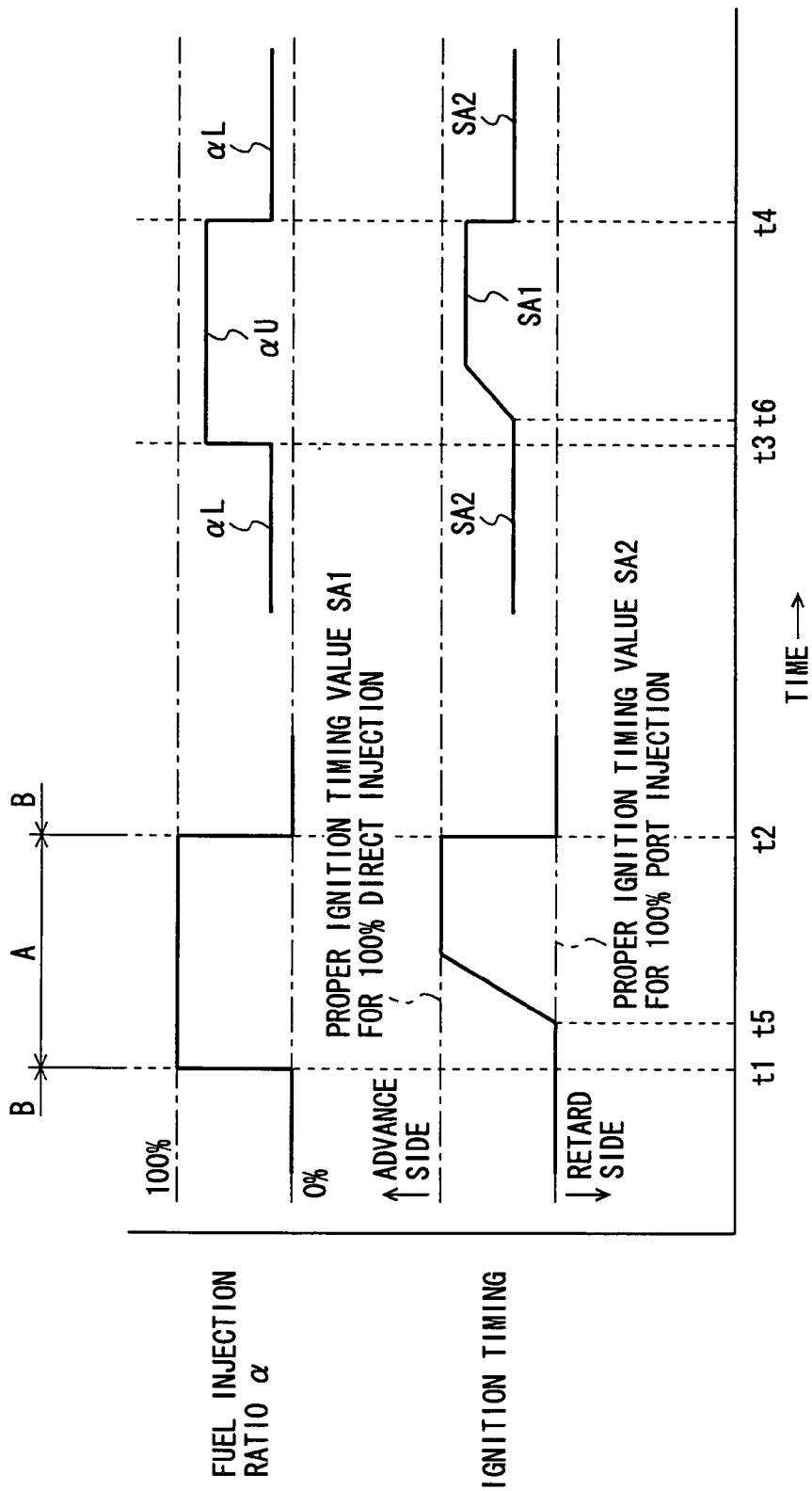
FIG. 7 is a timing chart showing how the ignition timing is changed under control of the ignition timing when the injection manner is changed, according to the first modification of the present invention.

For the sake of easy understanding of the first modification of the embodiment according to the control routine of the flowchart in FIG. 6 as discussed above, it is described with reference to the timing chart in FIG. 7 how the ignition timing is changed under control thereof as the injection manner is changed according to a change in operation state of engine 1. In FIG. 7, the left half shows an example of switching at time t1 from injection manner B of 100% port injection with the fuel injection ratio α of 0% to injection manner A of 100% direct injection as well as switching at time t2 from injection manner A to injection manner B of 100% port injection. In FIG. 7, the right half shows an example of switching at time t3 from injection ratio αL with a lower direct injection ratio of the injection manner (A+B) to another fuel injection ratio αU with a higher direct injection ratio and returning at time t4 to fuel injection ratio αL.

For example, when fuel injection ratio α is changed at time t1 from 0% to 100%, in at least a predetermined period of time after the change (t5−t1), proper ignition timing value SA2 before the change is selected as the one that is on the retard side with respect to proper ignition timing SA1 after the change, and the selected ignition timing value SA2 is set as the final ignition timing value. Thus, occurrence of knocking due to excessive advance is surely prevented.

In contrast, for example, when fuel injection ratio α is changed at time t2 from 100% to 0%, proper ignition timing value SA2 after the change is selected as the one that is on the retard side with respect to proper ignition timing value SA1 before the change, and the selected ignition timing value SA2 is set as the final ignition timing value. In this case, ignition timing value SA2 on the retard side is selected and thus excessive change in output power is avoided to prevent torque shock.

Further, for example, when the fuel injection ratio is changed at time t3 from αL % to αU %, in at least a predetermined period of time after the change (t6–t3), proper ignition timing value SA2 before the change is selected as the one that is on the retard side with respect to proper ignition timing value SA1 after the change, and ignition timing value SA2 is set as the final ignition timing value. In this case as well, occurrence of knocking due to excessive advance is surely prevented.

In contrast, for example, when the fuel injection ratio is changed at time t4 from αU % to αL %, proper ignition timing value SA2 after the change is selected as the one that is on the retard side with respect to proper ignition timing value SA1 before the change, and the selected ignition timing value SA2 is set as the final ignition timing value. In this case as well, since ignition timing value SA2 on the retard side is selected so that excessively great change in output power is avoided and the torque shock can be prevented.

In the timing chart shown in FIG. 7 discussed above, when fuel injection ratio α of the injection from in-cylinder injector 11 is changed to be higher than the fuel injection ratio of the injection from intake port injector 12, namely when the change is made at time t1 and time t3, the ignition timing is advanced, after the predetermined period of time (t5–t1) or predetermined period of time (t6–t3) has passed, at a predetermined rate (the magnitude thereof is determined by the factor described above) toward proper ignition timing value SA1 associated with fuel injection ratio α or fuel injection ratio αU after the change and a proper ignition timing is set in a transitional manner. This manner provides prevention of torque shock without excessively great change in output power.

Figure 8:
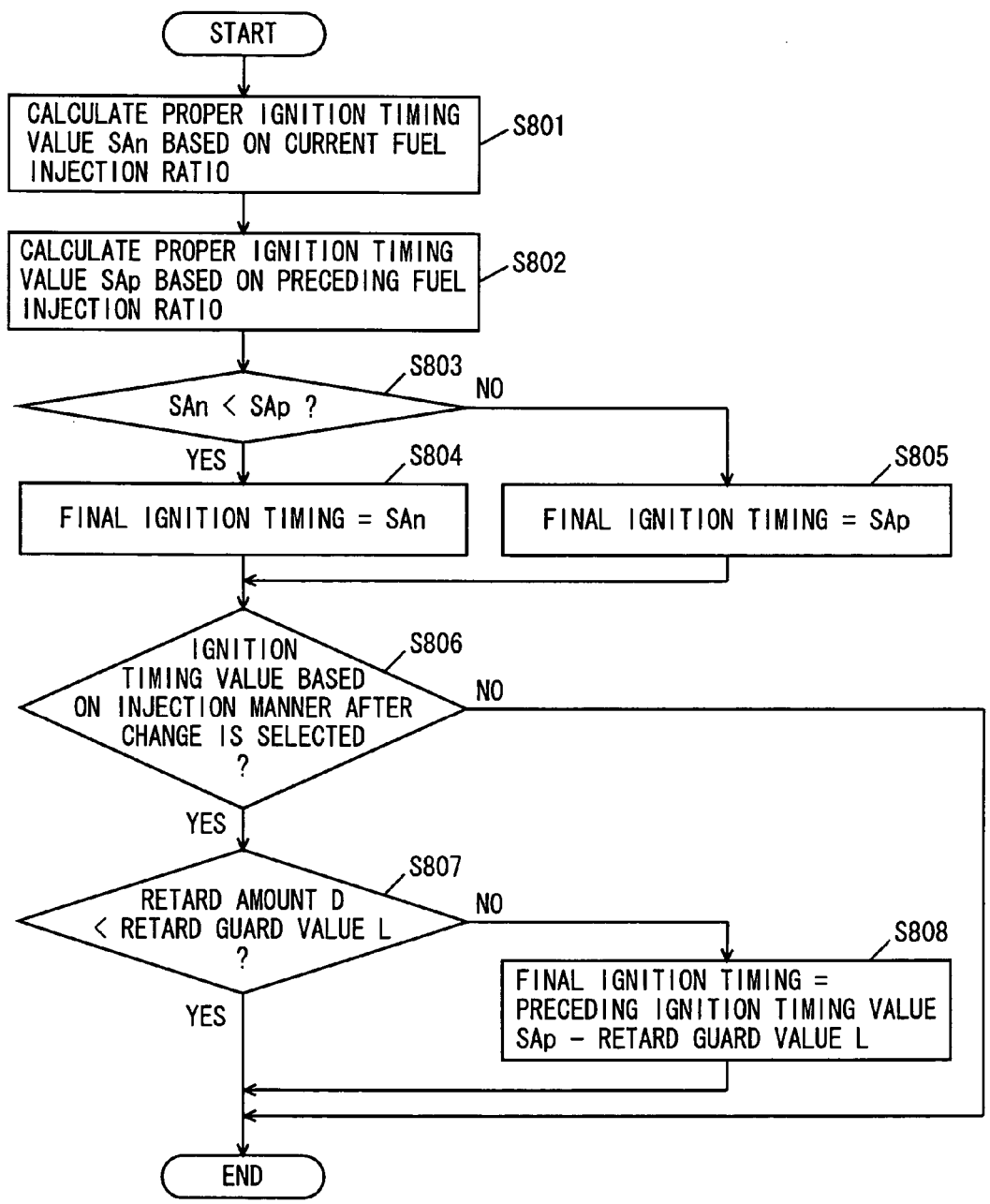
FIG. 8 is a flowchart showing an exemplary ignition timing control routine according to a second modification of the embodiment of the present invention.
Figure 9:
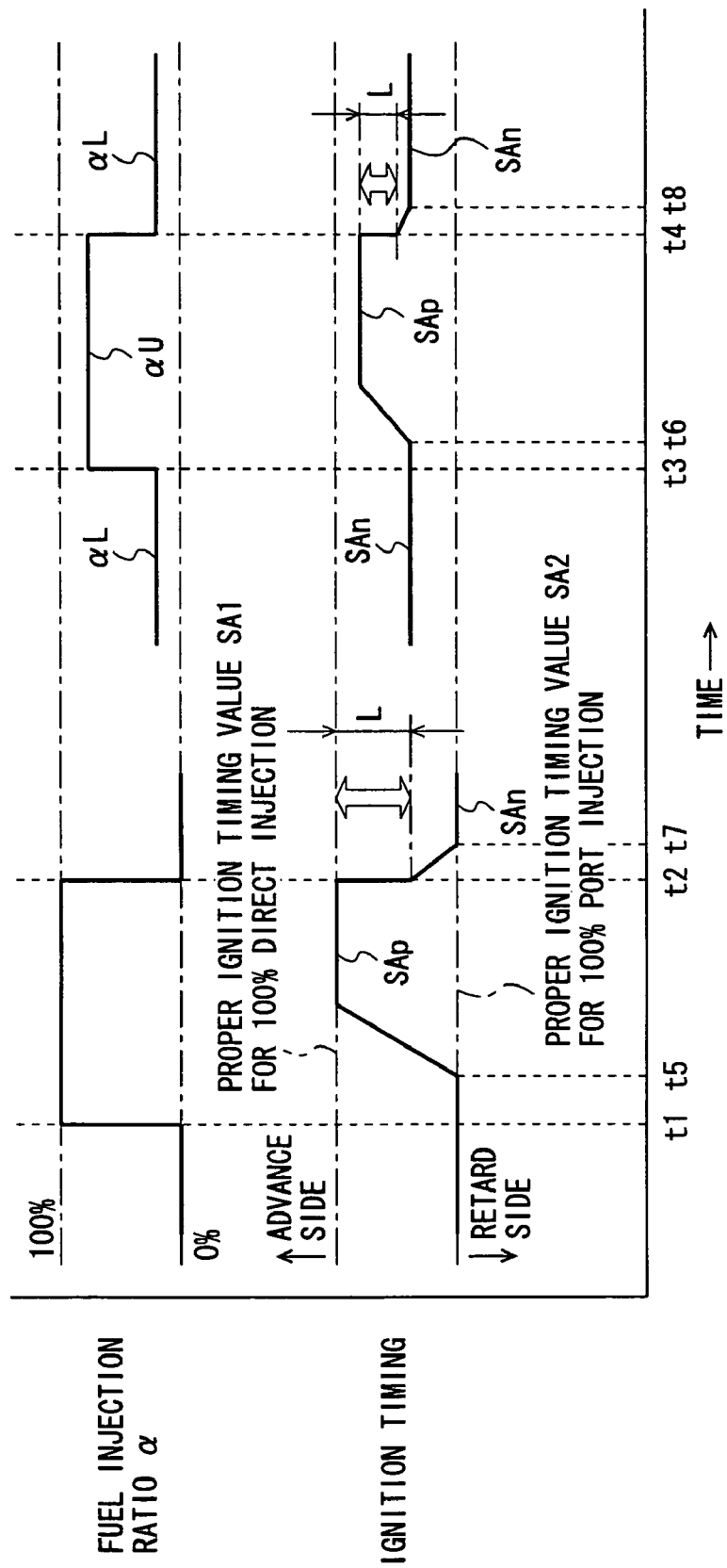
FIG. 9 is a timing chart showing how the ignition timing is changed under control of the ignition timing when the injection manner is changed, according to the second modification of the present invention.

Regarding a second modification of the embodiment of the present invention, a description is given with reference to the flowchart in FIG. 8 and the timing chart in FIG. 9. The second modification is applied to the case where the injection manner is changed according to a change in operation state of engine 1, for example, a change is made from injection manner A of 100% direct injection to injection manner B of 100% port injection or a change is made from a higher fuel injection ratio of the injection from in-cylinder injector 11 to a lower one when the injection manner is (A+B).

The control starts and in step S801, following the procedure of the routine of setting a proper ignition timing shown in the flowchart in FIG. 4 in the embodiment discussed above, proper ignition timing value SAn associated with the current fuel injection ratio after the change is calculated. In step S802, proper ignition timing value SAp associated with the preceding fuel injection ratio before the change is calculated. In the following step S803, it is determined which of proper ignition timing value SAn associated with the fuel injection ratio in the current operation state and proper ignition timing value SAp associated with the preceding fuel injection ratio is larger/smaller, specifically, which of the ignition timing values is on the retard side. It is noted that the ignition timing value is smaller when the amount of advance is smaller, namely when it is closer to the retard side. When it is determined that proper ignition timing value SAn associated with the current fuel injection ratio after the change is on the retard side, the routine proceeds to step S804 in which the proper ignition timing value SAn on the retard side is temporarily set as the final ignition timing value. When the proper ignition timing value SAp associated with the preceding fuel injection ratio is on the retard side, the routine proceeds to step S805 in which proper ignition timing value SAp on the retard side is temporarily set as the final ignition timing value.

Then, in step S806, it is determined whether the proper ignition timing value associated with the injection manner after the change or the fuel injection ratio after the change is selected. When the determination is "NO," this routine is ended. In other words, the operation is continued still using proper ignition timing value SAp associated with the preceding fuel injection ratio that is set temporarily as the final ignition timing value in step S805. In contrast, when proper ignition timing value SAn associated with the injection manner after the change or the fuel injection ratio after the change is selected, namely the determination is "YES," the routine proceeds to steep S807 in which it is determined whether an amount of retard D exceeds a retard guard value L that is a retard limit amount. Specifically, retard amount D is a difference between proper ignition timing value SAp associated with the preceding fuel injection ratio and proper ignition timing value SAn associated with the current fuel injection ratio, and the determination is made as to whether this the retard amount or difference exceeds retard guard value L of a predetermined magnitude. This retard guard value L is set for example with the purpose of preventing torque shock or abnormal combustion due to a sudden decrease in output power of engine 1 that occurs when retard amount D is excessively larger than an ideal amount. In view of this, as shown in FIG. 9, the retard amount may be set appropriately according to switching of the injection manner and the manner of change in fuel injection ratio as the operation state of engine 1 is changed.

In step S807, when it is determined that retard amount D is smaller than retard guard value L, such a problem as torque shock as described above does not arise. Thus, the routine is ended. In other words, the operation is performed using as the final ignition timing value the proper ignition timing value SAn associated with the current fuel injection ratio that is set temporarily as the final ignition timing value in step S804. In contrast, when it is determined in step S807 that retard amount D is larger than retard guard amount L, namely the determination is "NO," the routine proceeds to step S808. In step S808, the ignition timing value determined by subtracting retard guard value L from proper ignition timing value SAp associated with the preceding fuel injection ratio is set as the final ignition timing value and the routine is ended.

In the timing chart of FIG. 9, as the timing chart in FIG. 7, the left half shows an example in which switching is made at time t1 from injection manner B of 100% port injection with the fuel injection ratio α of 0% to injection manner A of 100% direct injection and switching is made at time t2 from injection manner A to injection manner B of 100% port injection. The right half shows an example in which a change is made at time t3 from fuel injection ratio αL with a lower ratio of the direct injection in injection manner (A+B) to fuel injection ratio αU with a higher ratio of the direct injection and the injection ratio is returned at time t4 to fuel injection ratio αL.

Here, when fuel injection ratio α is changed at time t1 from 0% to 100% and fuel injection ratio is changed at time t3 from αL % to αU %, the ignition timing is changed under control thereof in the same manner as that in the last modification of the embodiment shown in the timing chart in FIG. 7, and the description thereof is not repeated here.

The present modification of the embodiment is applied to the case where a change is made for example at time t2 from fuel injection ratio α of 100% to 0% and a change is made for example at time t4 from fuel injection ratio αU % to αL %, namely where the fuel injection ratio is changed so that fuel injection ratio α of the injection from in-cylinder injector 11 is lower than the fuel injection ratio of the injection from intake port injector 12. More specifically, when the change is made at time t2 or time t4, the ignition timing is retarded by retard guard value L that is at most a predetermined retard limit amount and, in at least a predetermined period or time (t7−t2) or (t8−t4) after the change, the ignition timing is set while retarded at a predetermined rate toward proper ignition timing value SAn after the change.

In accordance with the present modification of the embodiment, without an excessive decrease in output power, torque shock can be prevented.

Figure 10:
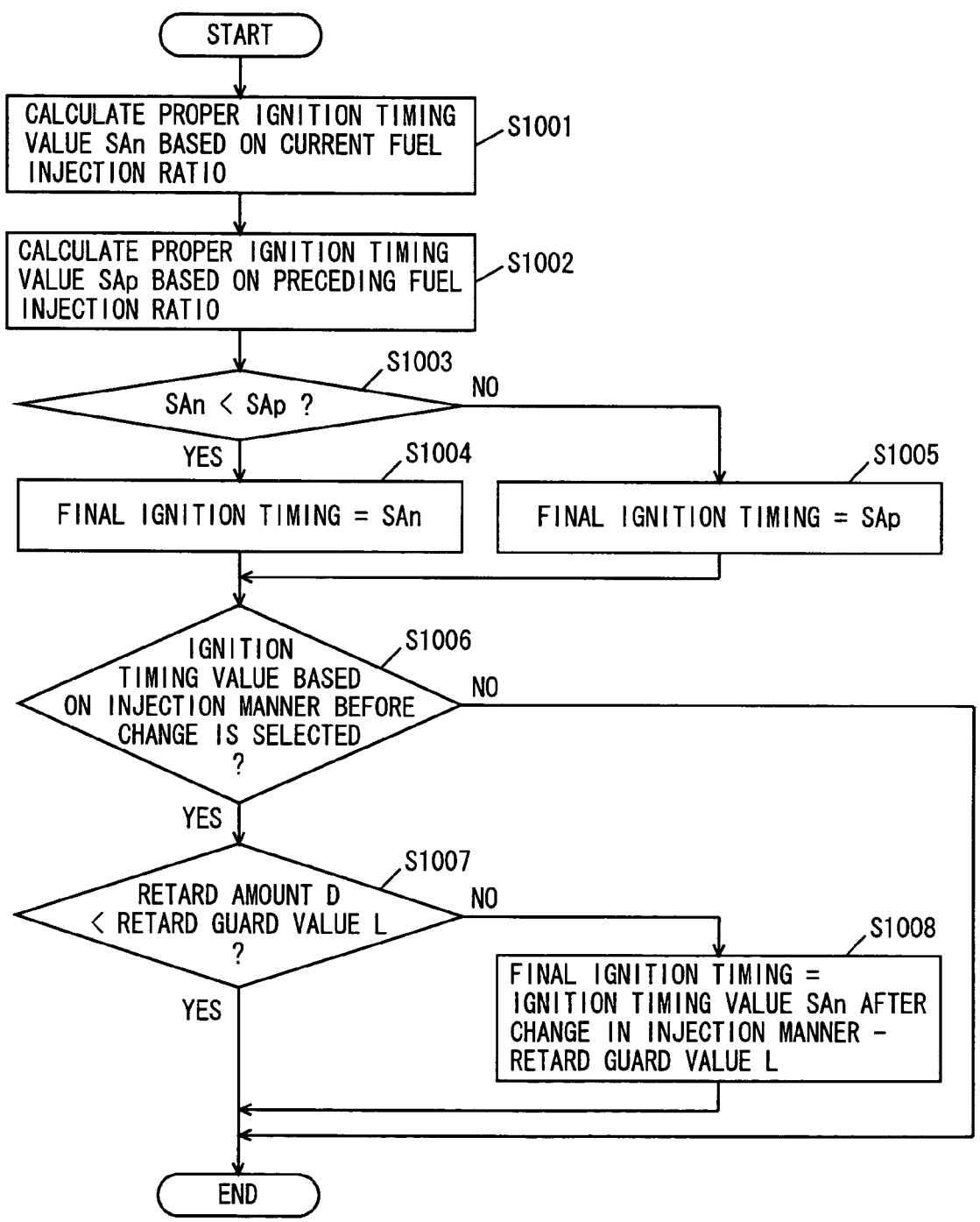
FIG. 10 is a flowchart showing an exemplary ignition timing control routine according to a third modification of the embodiment of the present invention.

A third modification of the embodiment of the present invention is now described with reference to the flowchart in FIG. 10 and the timing chart in FIG. 11. While the second modification of the embodiment is applied to the case where the injection manner is changed according to a change in operation state of engine 1, for example, injection manner A of 100% direct injection is changed to injection manner B of 100% port injection or a change is made in injection manner (A+B) from the state in which the fuel injection ratio of the injection from in-cylinder injector 11 is higher to the state in which that fuel injection ratio is lower, the third modification is applied to the case for example where injection manner B of 100% port injection is changed to injection manner A of 100% direct injection or a change is made from the state where the fuel injection ratio of the injection from in-cylinder injector 11 is lower to the state where the ratio is higher.

The control starts and, in step S1001, following the procedure of the routine of setting a proper ignition timing value in the flowchart of FIG. 4 in the embodiment discussed above, proper ignition timing value SAn associated with the current fuel injection ratio after the change is calculated. Subsequently, in step S1002, proper ignition timing value SAp associated with the preceding fuel injection ratio before the change is calculated. In the following step S1003, it is determined which of proper ignition timing value SAn associated with the fuel injection ratio in the current operation state and proper ignition timing value SAp associated with the preceding fuel injection ratio is larger/smaller, namely which of the timing values is on the retard side. It is noted again that the ignition timing value is smaller as the amount of advance is smaller and the ignition timing value is on the retard side. When it is determined here that proper ignition timing value SAn associated with the current fuel injection ratio after the change is on the retard side, the routine proceeds to step S1004 in which this proper ignition timing value SAn on the retard side is temporarily set as the final ignition timing value. When proper ignition timing value SAp associated with the preceding fuel injection ratio is on the retard side, the routine proceeds to step S1005 in which proper ignition timing value SAp on the retard side is temporarily set as well, as the final ignition timing value.

Then, in step S1006, it is determined whether a proper ignition timing value associated with the injection manner or the fuel injection ratio before the change is selected. If the determination is "NO," this routine is ended. In other words, the operation is continued still using proper ignition timing value SAp associated with the preceding fuel injection ratio that is set temporarily as the final ignition timing value in step S1005. In contrast, when proper ignition timing value SAp associated with the injection manner or fuel injection ratio before the change is selected, namely the determination is "YES," the routine proceeds to step S1007 in which it is determined whether the difference between proper ignition timing value SAn associated with the current fuel injection ratio and proper ignition timing value SAp associated with the preceding fuel injection ratio, namely retard amount D with respect to proper ignition timing value SAn associated with the current fuel injection ratio, does not exceed retard guard value L as a retard limit amount. More specifically, it is determined whether or not this retard amount D does not exceed retard guard value L of a predetermined magnitude. As described in connection with the preceding modification, retard guard value L is set to prevent torque shock and abnormal combustion due to a sudden decrease in output power of engine 1 that is caused when retard amount D is excessively larger than an ideal amount. In view of this, as shown in FIG. 11, retard guard value L may appropriately be set in magnitude according to switching of the injection manner and a change in fuel injection ratio according to a change in operation state of engine 1.

In step S1007, when it is determined that retard amount D is smaller than retard guard value L, such a problem of torque shock as discussed above does not arise. Then, this routine is ended. In other words, the operation is performed using, as the final ignition timing value, proper ignition timing value SAn associated with the current fuel injection ratio that is temporarily set as the final ignition timing value in step S1004. In contrast, when it is determined in step S1007 that retard amount D is larger than retard guard value L, namely the determination is "NO," the routine proceeds to step S1008. In step S1008, the final ignition timing value is determined by subtracting retard guard value L from proper ignition timing value SAn associated with the current fuel injection ratio after the injection manner is changed. Then, this routine is ended.

Figure 11:
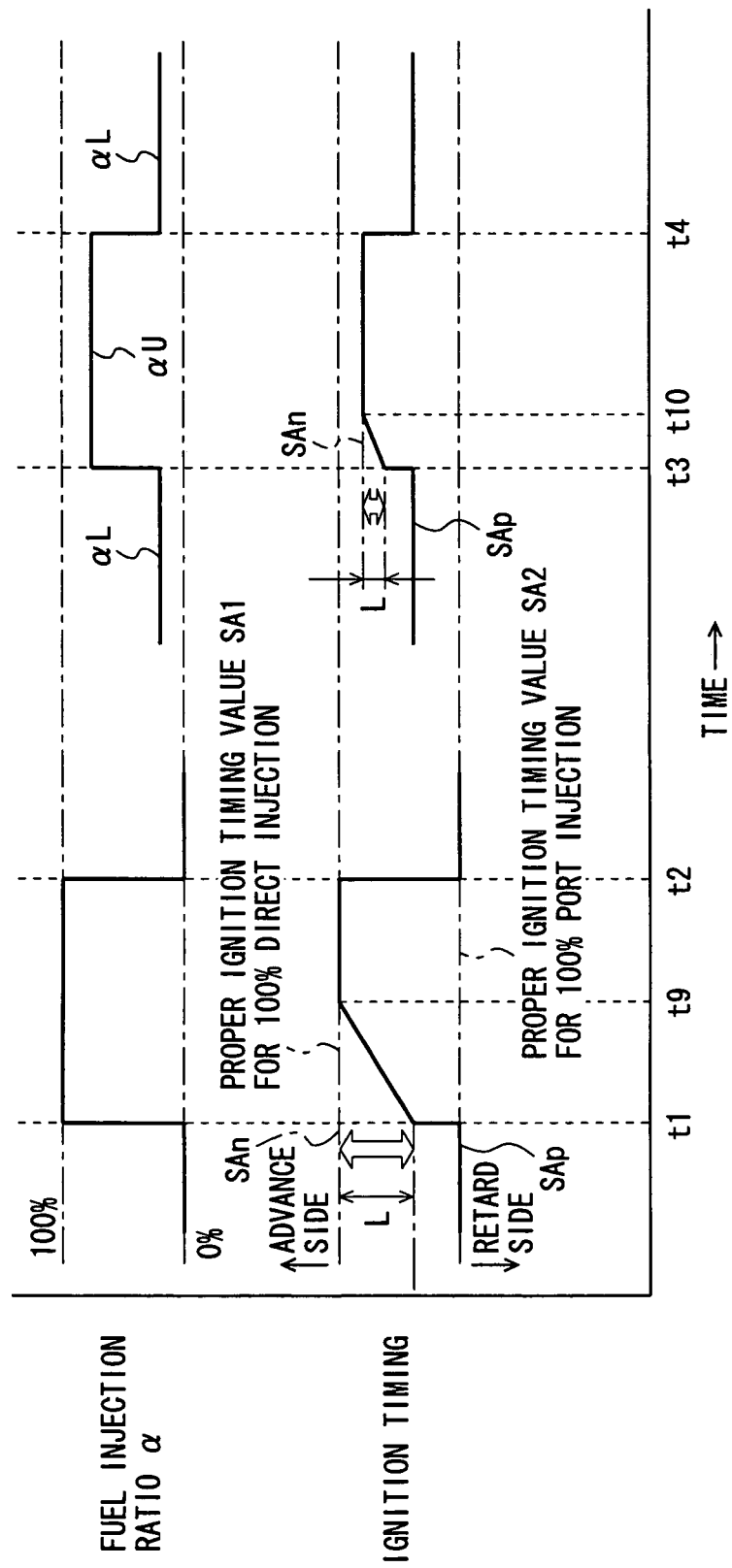
FIG. 11 is a timing chart showing how the ignition timing is changed under control of the ignition timing when the injection manner is changed, according to the third modification of the present invention.

In the timing chart in FIG. 11 as well, like the timing charts in FIGS. 7 and 9, the left half shows an example where switching is made at time t1 from injection manner B of 100% port injection with fuel injection ratio α of 0% to injection manner A of 100% direct injection and a switching is made at time t2 from injection manner A to injection manner B of 100% port injection. The right half shows an example where a change is made at time t3 from fuel injection ratio αL with a lower ratio of the direct injection to fuel injection ratio αU with a higher ratio of the direct injection in the injection manner (A+B), and the fuel injection ratio is returned at time t4 to fuel injection ratio αL.

Here, when fuel injection ratio α is changed at time t2 from 100% to 0% and the fuel injection ratio is changed at time t4 from αU % to αL %, the ignition timing is changed under control thereof, which is the same as that of the preceding modification of embodiment shown in the timing chart of FIG. 7 and the description is not repeated here. The present modification is applied to the case where fuel injection ratio α is changed for example at time t1 from 0% to 100% and the fuel injection ratio is changed for example at time t3 from fuel injection ratio αL % to αU %, in other words, the fuel injection ratio is changed so that fuel injection ratio α of the injection from in-cylinder injector 11 is higher than the fuel injection ratio of the injection from intake port injector 12. More specifically, when the change is made at time t1 or time t3, the ignition timing is advanced to the ignition timing retarded by retard guard value L that is a predetermined retard limit amount with respect to proper ignition timing value SAn associated with the fuel injection ratio after the change. In at least a predetermined period (t9–t1) or (t10–t3) after the change, the ignition timing is set by being advanced at a predetermined rate toward proper ignition timing value SAn after the change.

In accordance with the present modification, like the above-described embodiment and modifications, torque shock can be prevented without excessive decrease in output power.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An ignition timing control apparatus for an internal combustion engine including an in-cylinder injector and an intake port injector, comprising
   a proper ignition timing setting unit for setting a proper ignition timing according to a fuel injection ratio of injection from said in-cylinder injector and a fuel injection ratio of injection from said intake port injector, wherein
   said proper ignition timing setting unit sets a proper ignition timing according to the fuel injection ratio in a current operation state, based on at least a basic ignition timing value in a case where the fuel injection ratio of the injection from said in-cylinder injector exceeds 50% and thus the injection is mainly direct injection and a basic ignition timing value in a case where the fuel injection ratio of the injection from said intake port injector exceeds 50% and thus the injection is mainly port injection.

2. The ignition timing control apparatus for an internal combustion engine according to claim 1, wherein
   when a change is made in said fuel injection ratio so that the fuel injection ratio of the injection from said in-cylinder injector is higher than the fuel injection ratio of the injection from said intake port injector, said proper ignition timing setting unit sets the ignition timing at an ignition timing retarded by a predetermined retard limit amount with respect to a proper ignition timing value associated with the fuel injection ratio after the change, and thereafter setting the ignition timing by advancing the ignition timing at a predetermined rate toward the proper ignition timing value associated with the fuel injection ratio after the change.

3. The ignition timing control apparatus for an internal combustion engine according to claim 1, wherein
   when a change is made in said fuel injection ratio, said proper ignition timing setting unit selects one of a proper ignition timing value before the change and a proper ignition timing value after the change that is on the retard side and sets, in at least a predetermined period of time after the change, the ignition timing at the selected ignition timing value.

4. The ignition timing control apparatus for an internal combustion engine according to claim 3, wherein
   when a change is made in said fuel injection ratio so that the fuel injection ratio of the injection from said in-cylinder injector is lower than the fuel injection ratio of the injection from said intake port injector, said proper ignition timing setting unit sets the ignition timing by retarding the ignition timing by at most a predetermined retard limit amount and thereafter retarding the ignition timing at a predetermined rate toward the proper ignition timing value associated with the fuel injection ratio after the change.

5. The ignition timing control apparatus for an internal combustion engine according to claim 3, wherein
   when a change is made in said fuel injection ratio so that the fuel injection ratio of the injection from said in-cylinder injector is higher than the fuel injection ratio of the injection from said intake port injector, said proper ignition timing setting unit sets the ignition timing by advancing the ignition timing at a predetermined rate toward the proper ignition timing value associated with the fuel injection ratio after the change, after said predetermined period of time has passed.

6. The ignition timing control apparatus for an internal combustion engine according to claim 5, wherein
   when a change is made in said fuel injection ratio so that the fuel injection ratio of the injection from said in-cylinder injector is lower than the fuel injection ratio of the injection from said intake port injector, said proper ignition timing setting unit sets the ignition timing by retarding the ignition timing by at most a predetermined retard limit amount and thereafter retarding the ignition timing at a predetermined rate toward the proper ignition timing value associated with the fuel injection ratio after the change.

7. An ignition timing control apparatus for an internal combustion engine including an in-cylinder injector and an intake port injector, comprising
   proper ignition timing setting means for setting a proper ignition timing according to a fuel injection ratio of injection from said in-cylinder injector and a fuel injection ratio of injection from said intake port injector, wherein
   said proper ignition timing setting means includes means for setting a proper ignition timing according to the fuel injection ratio in a current operation state, based on at least a basic ignition timing value in a case where the fuel injection ratio of the injection from said in-cylinder injector exceeds 50% and thus the injection is mainly direct injection and a basic ignition timing value in a case where the fuel injection ratio of the injection from said intake port injector exceeds 50% and thus the injection is mainly port injection.

8. The ignition timing control apparatus for an internal combustion engine according to claim 7, wherein
   said proper ignition timing setting means includes means for setting, when a change is made in said fuel injection ratio so that the fuel injection ratio of the injection from said in-cylinder injector is higher than the fuel injection ratio of the injection from said intake port injector, the ignition timing at an ignition timing retarded by a predetermined retard limit amount with respect to a proper ignition timing value associated with the fuel injection ratio after the change, and thereafter setting the ignition timing by advancing the ignition timing at a predetermined rate toward the proper ignition timing value associated with the fuel injection ratio after the change.

9. The ignition timing control apparatus for an internal combustion engine according to claim 7, wherein
said proper ignition timing setting means includes means for selecting, when a change is made in said fuel injection ratio, one of a proper ignition timing value before the change and a proper ignition timing value after the change that is on the retard side and setting, in at least a predetermined period of time after the change, the ignition timing at the selected ignition timing value.

10. The ignition timing control apparatus for an internal combustion engine according to claim 9, wherein
said proper ignition timing setting means includes means for setting, when a change is made in said fuel injection ratio so that the fuel injection ratio of the injection from said in-cylinder injector is lower than the fuel injection ratio of the injection from said intake port injector, the ignition timing by retarding the ignition timing by at most a predetermined retard limit amount and thereafter retarding the ignition timing at a predetermined rate toward the proper ignition timing value associated with the fuel injection ratio after the change.

11. The ignition timing control apparatus for an internal combustion engine according to claim 9, wherein
said proper ignition timing setting means includes means for setting, when a change is made in said fuel injection ratio so that the fuel injection ratio of the injection from said in-cylinder injector is higher than the fuel injection ratio of the injection from said intake port injector, the ignition timing by advancing the ignition timing at a predetermined rate toward the proper ignition timing value associated with the fuel injection ratio after the change, after said predetermined period of time has passed.

12. The ignition timing control apparatus for an internal combustion engine according to claim 11, wherein
said proper ignition timing setting means includes means for setting, when a change is made in said fuel injection ratio so that the fuel injection ratio of the injection from said in-cylinder injector is lower than the fuel injection ratio of the injection from said intake port injector, the ignition timing by retarding the ignition timing by at most a predetermined retard limit amount and thereafter retarding the ignition timing at a predetermined rate toward the proper ignition timing value associated with the fuel injection ratio after the change.

* * * * *